United States Patent
Fischer et al.

(10) Patent No.: US 11,926,362 B2
(45) Date of Patent: Mar. 12, 2024

(54) CAMBER ADJUSTMENT SYSTEM

(71) Applicants: Abraham Fischer, Hawthorne, CA (US); Ben Schaffer, Hawthorne, CA (US)

(72) Inventors: Abraham Fischer, Hawthorne, CA (US); Ben Schaffer, Hawthorne, CA (US)

( * ) Notice: Subject to any disclaimer, the term of this patent is extended or adjusted under 35 U.S.C. 154(b) by 95 days.

(21) Appl. No.: 17/401,302

(22) Filed: Aug. 12, 2021

(65) Prior Publication Data
US 2022/0048568 A1 Feb. 17, 2022

Related U.S. Application Data

(60) Provisional application No. 63/064,420, filed on Aug. 12, 2020.

(51) Int. Cl.
*B62D 17/00* (2006.01)
*B60G 7/00* (2006.01)

(52) U.S. Cl.
CPC ............ *B62D 17/00* (2013.01); *B60G 7/001* (2013.01); *B60G 7/005* (2013.01); *B60G 2206/82* (2013.01)

(58) Field of Classification Search
CPC ..... B62D 17/00; B60G 2206/82; B60G 7/001
See application file for complete search history.

(56) References Cited

U.S. PATENT DOCUMENTS

| | | | | |
|---|---|---|---|---|
| 4,921,271 A | * | 5/1990 | Berry | B62D 17/00 280/86.756 |
| 4,970,801 A | * | 11/1990 | Specktor | B62D 17/00 33/600 |
| 5,538,273 A | * | 7/1996 | Osenbaugh | B62D 17/00 280/86.756 |
| 6,224,075 B1 | * | 5/2001 | McIntyre | B62D 17/00 280/86.756 |
| 7,278,648 B2 | * | 10/2007 | Bobbitt, III | B62D 17/00 280/124.123 |
| 7,513,514 B1 | * | 4/2009 | Schlosser | B62D 17/00 280/86.756 |
| 2005/0280229 A1 | * | 12/2005 | Ingalls | B62D 17/00 280/86.756 |
| 2007/0152417 A1 | * | 7/2007 | Ingalls | B62D 17/00 280/86.756 |

FOREIGN PATENT DOCUMENTS

| | | | | |
|---|---|---|---|---|
| CN | 102205780 B | * | 10/2014 | ............ B60G 7/006 |
| CN | 106080073 A | * | 11/2016 | |

OTHER PUBLICATIONS

Cui, CN-106080073-A, Nov. 2016, Machine Translation of Specification.*
Lee, CN-102205780-B, Oct. 2014, Machine Translation of Specification.*

* cited by examiner

*Primary Examiner* — Drew J Brown
*Assistant Examiner* — Matthew Joseph Ganci
(74) *Attorney, Agent, or Firm* — John D. Tran; RHEMA LAW GROUP, P.C

(57) ABSTRACT

A method and apparatus for a camber adjustment system for a control arm of the subject matter of the present disclosure which allows the quick change of camber settings of a vehicle by utilizing a pill adjustment component containing several camber settings including a track and street setting.

20 Claims, 10 Drawing Sheets

CAMBER ADJUSTMENT SYSTEM

CROSS-REFERENCE TO RELATED APPLICATIONS

This claims priority benefit to all common subject matter of U.S. Provisional Patent Application 63/064,420 filed Aug. 12, 2020. The content of this application is incorporated herein by reference in its entirety.

TECHNICAL FIELD

The field of the subject matter of the present disclosure is generally vehicle/car after-market performance parts, kits/systems. In particular, the subject matter of the present disclosure involves a camber adjustment system for a control arm for a vehicle.

SUMMARY

Although there exists a variety of camber alignment products to modify, change, and/or customize camber settings on cars/vehicles, these products are suitable for the specific individual purposes to which they address, they would not be suitable for the purposes of the subject matter of the present disclosure.

The subject matter of the present disclosure is directed toward a camber adjustment system for a control arm for a vehicle. In one preferred embodiment, the control arm is considered the upper control arm of the vehicle.

Another subject matter of the present disclosure is directed to a quick-change camber adjustment system for a control arm which is fast, easy, reliable, and still allows full range of adjustment for maximum performance.

In one embodiment, the camber adjustment system for a control arm of the subject matter of the present disclosure makes use a "pill" style adjustment technique that allows two precise settings, one ideal for street use/performance and the other for ideal for track use/performance. The quick-change camber adjustment system subject matter of the present disclosure can further be extended to be a 3 or 4 or more settings without compromising any of the benefits. The camber adjustment system subject matter for an upper control arm of the present disclosure further provides the ability to measure alignment settings with accuracy and with precise, useable settings with a full range of camber and toe adjustments.

In another embodiment, the camber adjustment system for a control arm of the subject matter of the present disclosure provides infinitely adjustable arm ends to allow for full range of camber and tow adjustment in a vehicle alignment setting and allows for quick and/or instant adjustment between street and track environment when away from a vehicle alignment machine such as at home, at the track or at a racetrack.

In another embodiment, the camber adjustment system subject matter of the present disclosure reduces the reliance on full kits and necessary/critical hardware that adds complexity, costs, and can be lost and thus potentially make it impossible for the user to perform a quick-change camber adjustment on their car/vehicle.

Previous or current available camber adjustment products on the market fail to address the innovative and unique features as found in the current subject matter of the present disclosure.

The subject matter of the present disclosure also further includes objects, features, aspects, and advantages in addition to or in place of those mentioned above. These objects, features, aspects, and advantages of the subject matter of the present disclosure will become more apparent from the following detailed description of preferred embodiments of the subject matter of the present disclosure, along with the accompanying drawings.

Many alterations and modifications may be made by those having ordinary skill in the art without departing from the spirit and scope of the subject matter of the present disclosure. Therefore, it must be understood that any illustrated or preferred embodiments discussed in this application have been set forth only for the purposes of example, and that it should not be taken as limiting the subject matter of the present disclosure. Thus, preferred or illustrative embodiments of a camber adjustment system of the subject matter of the present disclosure has been disclosed. It should be apparent, however, to those skilled in the art that many more modifications besides those already described are possible without departing from the inventive concepts herein. While aspects of the subject matter of the present disclosure have been described with reference to at least one exemplary embodiment, it is to be clearly understood by those skilled in the art that the subject matter of the present disclosure is not limited in any way.

BRIEF DESCRIPTION OF THE DRAWINGS

The subject matter of the present disclosure is illustrated in the figures of the accompanying drawings which are meant to be exemplary and not limiting, and in which.

Figure 1:
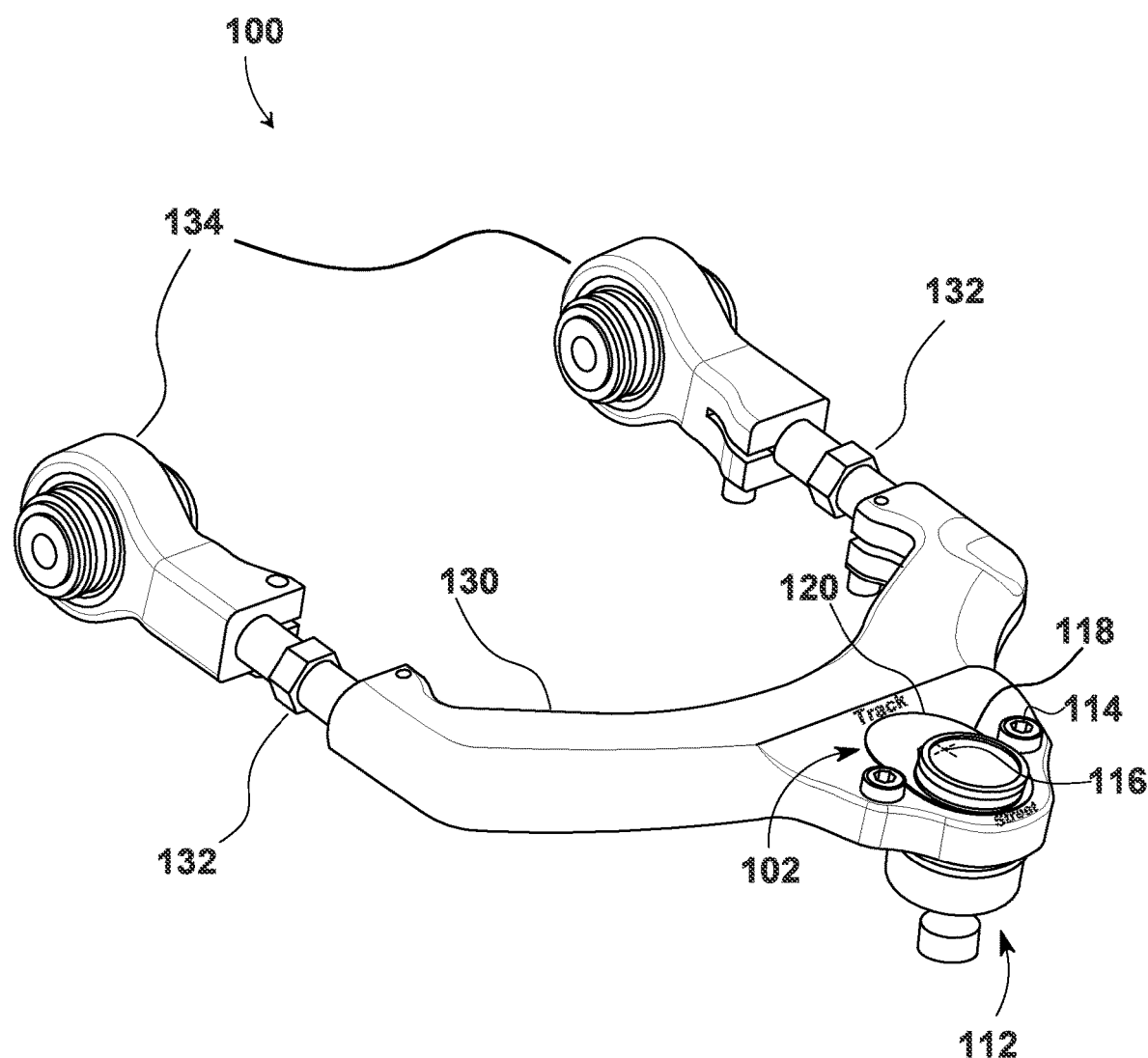
FIG. 1 is an illustrative embodiment showing a perspective view of the camber adjustment system for a control arm of the subject matter of the present disclosure.

Thus, it has been discovered that the camber adjustment system subject matter of the present disclosure furnishes important and heretofore unknown and unavailable solutions, capabilities, and functional aspects.

The resulting configurations are straightforward, cost-effective, uncomplicated, highly versatile, effective, and can be implemented by adapting known components for ready, efficient, and economical manufacturing, application, and utilization.

While the subject matter of the present disclosure has been described in conjunction with a specific best mode, it is to be understood that many alternatives, modifications, and variations will be apparent to those ordinarily skilled in the art in light of the preceding description.

Accordingly, it is intended to embrace all such alternatives, modifications, and variations, which fall within the scope of the included claims. All matters set forth herein or shown in the accompanying drawings are to be interpreted in an illustrative and non-limiting sense.

DETAILED DESCRIPTION

In the following description, reference is made to the accompanying drawings that form a part hereof, and in which are shown by way of illustration, embodiments in which the camber adjustment system subject matter of the present disclosure may be practiced. It is to be understood that other embodiments may be utilized and structural changes may be made without departing from the scope of the camber adjustment system subject matter of the present disclosure.

When features, aspects, or embodiments of the camber adjustment systems subject matter of the present disclosure are described in terms of steps of a process, an operation, a control flow, or a flow chart, it is to be understood that the steps can be combined, performed in a different order, deleted, or include additional steps without departing from camber adjustment system for a control arm of the subject matter of the present disclosure as described herein.

The camber adjustment system subject matter of the present disclosure is described in sufficient detail to enable those skilled in the art to make and use the camber adjustment system subject matter of the present disclosure and provide numerous specific details to give a thorough understanding of the camber adjustment system; however, it will be apparent that the camber adjustment system subject matter of the present disclosure may be practiced without these specific details.

In order to avoid obscuring the camber adjustment system subject matter of the present disclosure, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Referring now to FIG. 1, therein is shown a perspective view of the camber adjustment system for a control arm of the subject matter of the present disclosure 100, which comprises of a removable pill shaped adjustment component 102 having a center area 116, a ball joint attachment 112, several locking screws 114, a rectangular like side 118 of the pill like structure 102, and a rounded corner like side 120 of the pill adjustment component 102. Depending on the settings, the camber adjustment system for a control arm of the subject matter of the present disclosure 100 can amplify and/or minimize the impact of other vehicle components that traditionally work in conjunction with a control arm such as a wishbone 130, turnbuckles 132, and camber bushings 134. In one preferred embodiment, the pill adjustment component 102 allows for the ability to perform quick change pre-set adjustments to allow instant camber adjustments for the vehicle. In use, the technician and/or user can quickly lock and/or remove the pill adjustment component 102 by screwing and/or unscrewing the lock screws 114.

Figure 2:
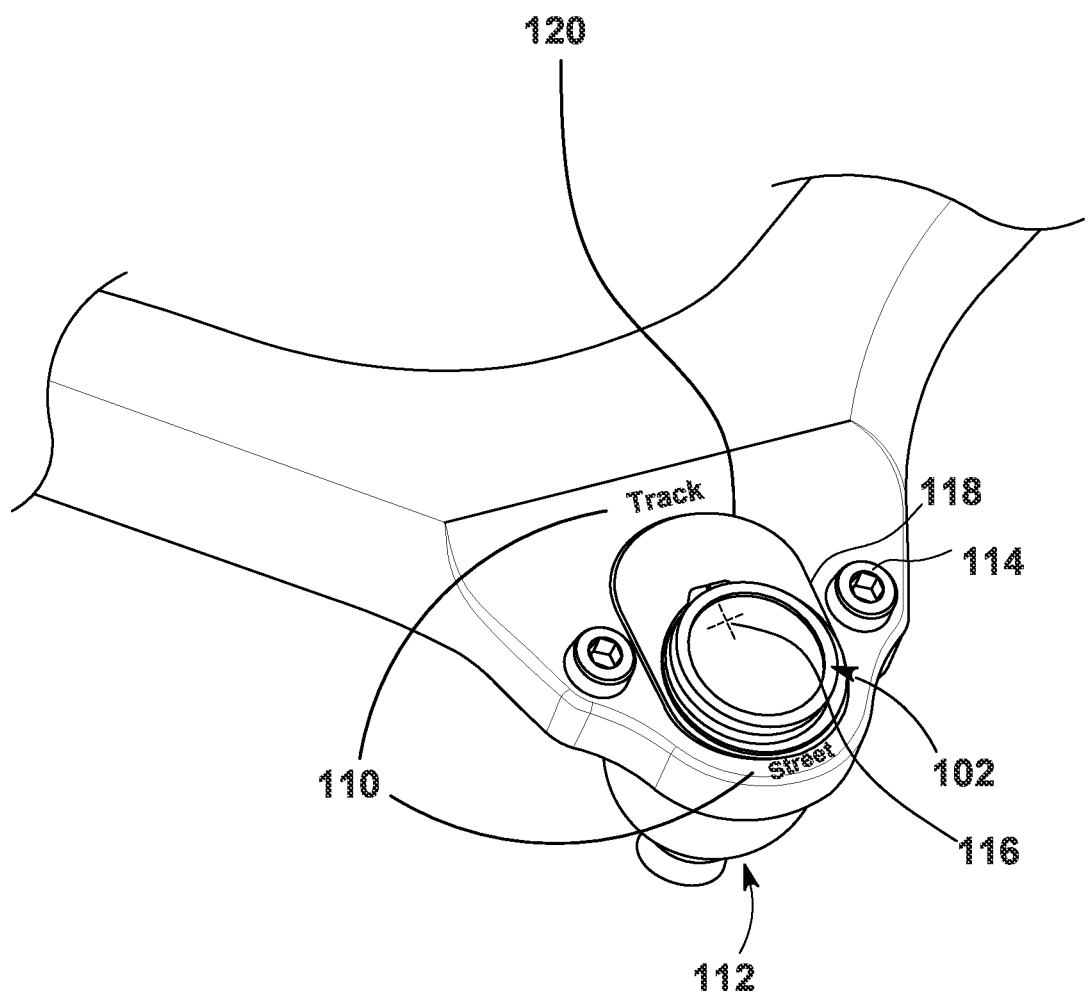
FIG. 2 is another illustrative embodiment showing a close-up view of the "pill" adjustment component of the camber adjustment system for a control arm of the subject matter of the present disclosure.

FIG. 2 shows a close up of the pill like structure 102 having several settings 110 comprising of a "street" setting 122 and a "track" setting 124. In one preferred embodiment, the pill adjustment component allows the quick-change adjustments to the vehicle's camber settings. Commonly, camber is a measurement of the centerline of a vehicle's wheel/tire relative to the road surface. Camber is typically expressed in degrees and greatly affects the handling dynamics of a vehicle. Negative camber is when the top of the tire tucks, positive camber is when the top of the tire is tucked outward and neutral camber is when the top of the tire is directly perpendicular to the ground.

Though camber settings can vary from vehicle to vehicle, traditionally for a normal car, it is common for the vehicle's wheel/tire to maintain a slight amount of negative camber (0.5-1 degrees) to have a good balance of cornering, braking grip and tire wear. On most vehicles, it's common to have slightly more negative camber (0.8-1.3 degrees) in the rear to reduce the chances of oversteer, which can cause a loss of grip in rear. However, in practical applications, it is often difficult for a technician and/or user to adjust a vehicle's camber due to the requirement of special tools and equipment which results in a time intensive, inefficient and laborious exercise.

An inventive feature of the camber adjustment system of the present disclosure is the ability for the pill adjustment component 102 to allow for a technician and/or use to quickly and effortlessly change the camber of a vehicle to a particular preset depending on the desired needs of the circumstance. Here, in one preferred embodiment, the camber adjustment system of the present disclosure contains several settings 110, including a street setting 122 and a track setting 124. In general, the street setting 122 provides better tire wear but less grip on the track/street. Whereas the track setting 124 provides more grip on the track/street but results in worse tire wear. In a preferred embodiment, the track setting 124 provides approximately 2 degrees more camber than the street setting 122. A major inventive advantage of the camber adjustment system of the present disclosure is that it allows a technician and/or user to perform a quick-change camber adjustment by simply changing the pill adjustment component by aligning it to either in the street setting 122 or track setting 124, which affects the camber of the vehicle to defined presets. As clearly shown in FIG. 2, the pill adjustment component 102 provides a visual confirmation to the technician and/or user of what particular camber setting the vehicle is in as a result of where the center 116 of the pill adjustment component is nearest or pointing to. In FIG. 2, the camber adjustment system of the present disclosure is shown to be in the street 122 setting.

Figure 3:
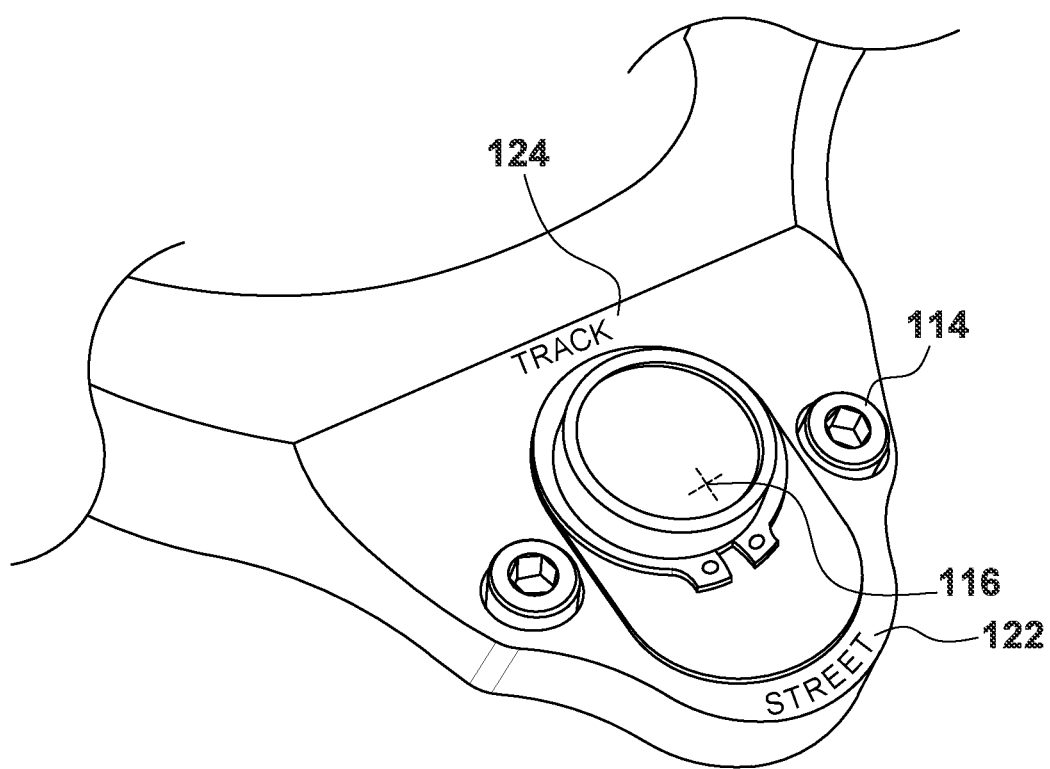
FIG. 3 is another illustrative embodiment showing a user removing the "pill" component in a track setting of the camber adjustment system of a control arm of the subject matter of the present disclosure.

In FIG. 3, the camber adjustment system for a control arm of the subject matter of the present disclosure would be in the track setting 124 because the pill adjustment component 102 is closest to or pointing to the track setting 124 word. The several lock screws 114 ensure the pill-like structure 102 stays locked into the desired setting 110 position.

Figure 4:
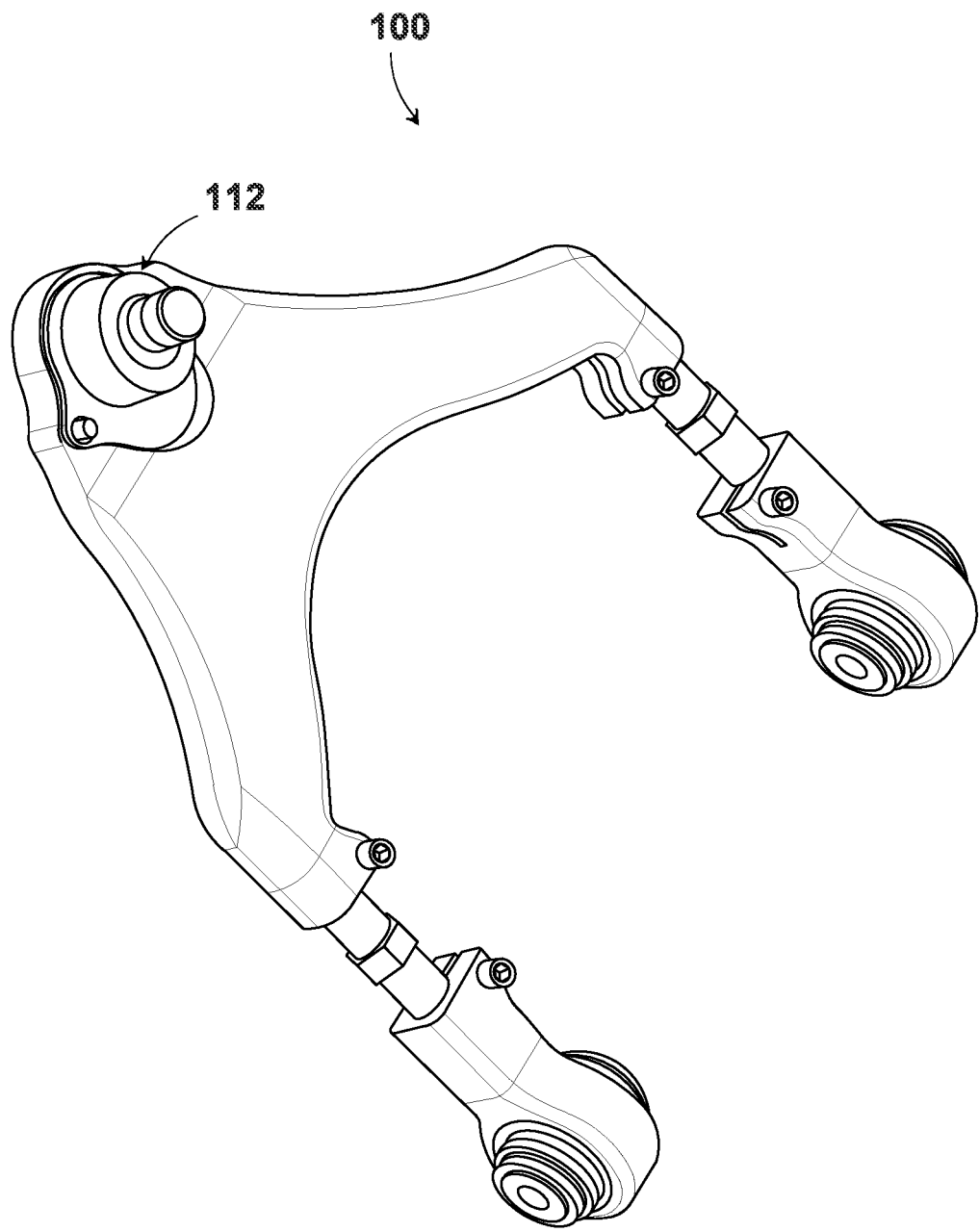
FIG. 4 is another illustrative embodiment showing a bottom view of the camber adjustment system subject matter for a control arm of the present disclosure.

FIG. 4 shows a bottom perspective view of the camber adjustment system for a control arm of the subject matter of the present disclosure 100, showing more clearly the ball joint attachment 112, which is couple to an upright component (not pictured in FIG. 4).

Figure 5:
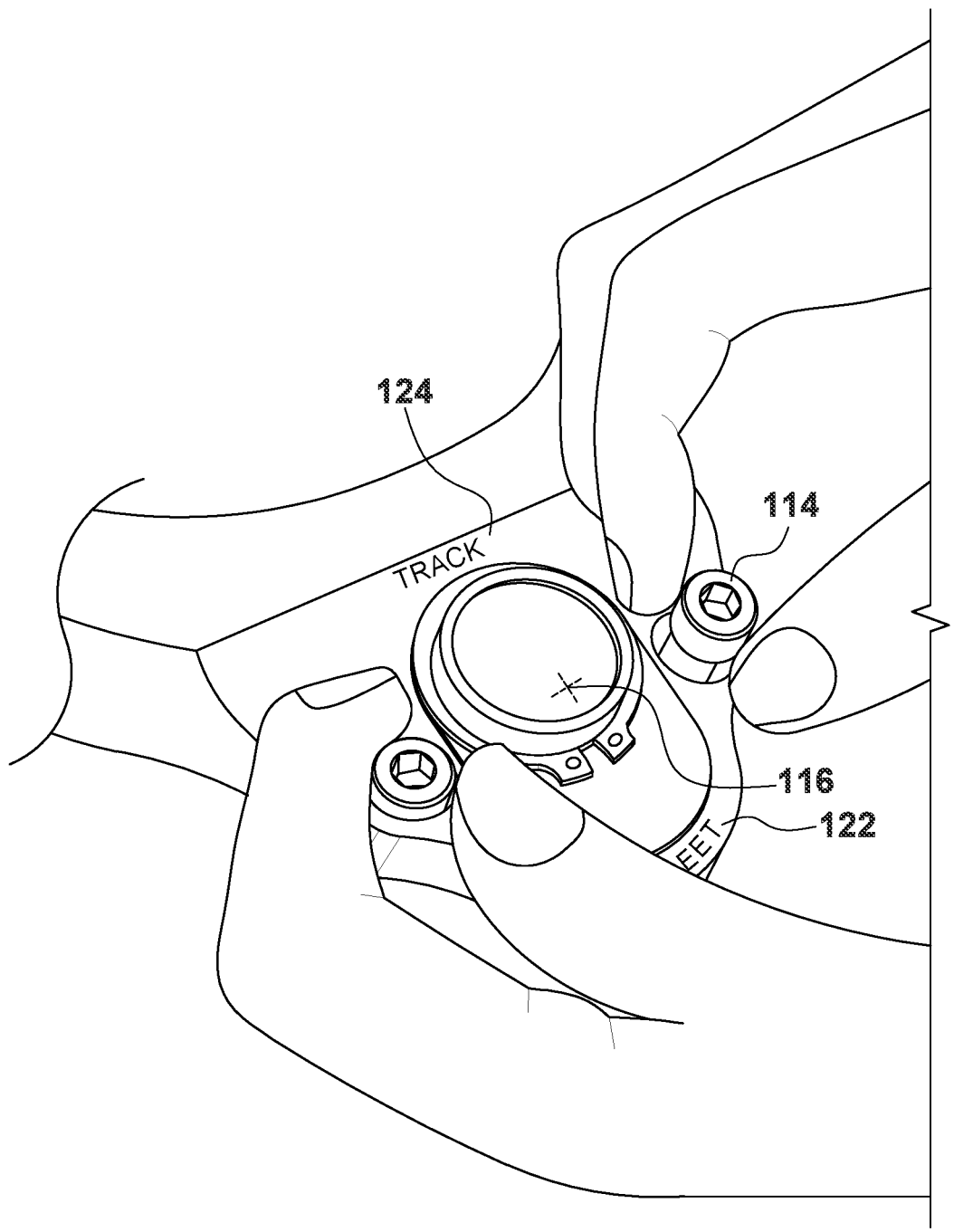
FIG. 5 is another illustrative embodiment showing a user removing the plurality of screws that that locks and/or fixes the "pill" component in a track setting of the camber adjustment system for a control arm of the subject matter of the present disclosure.
Figure 6:
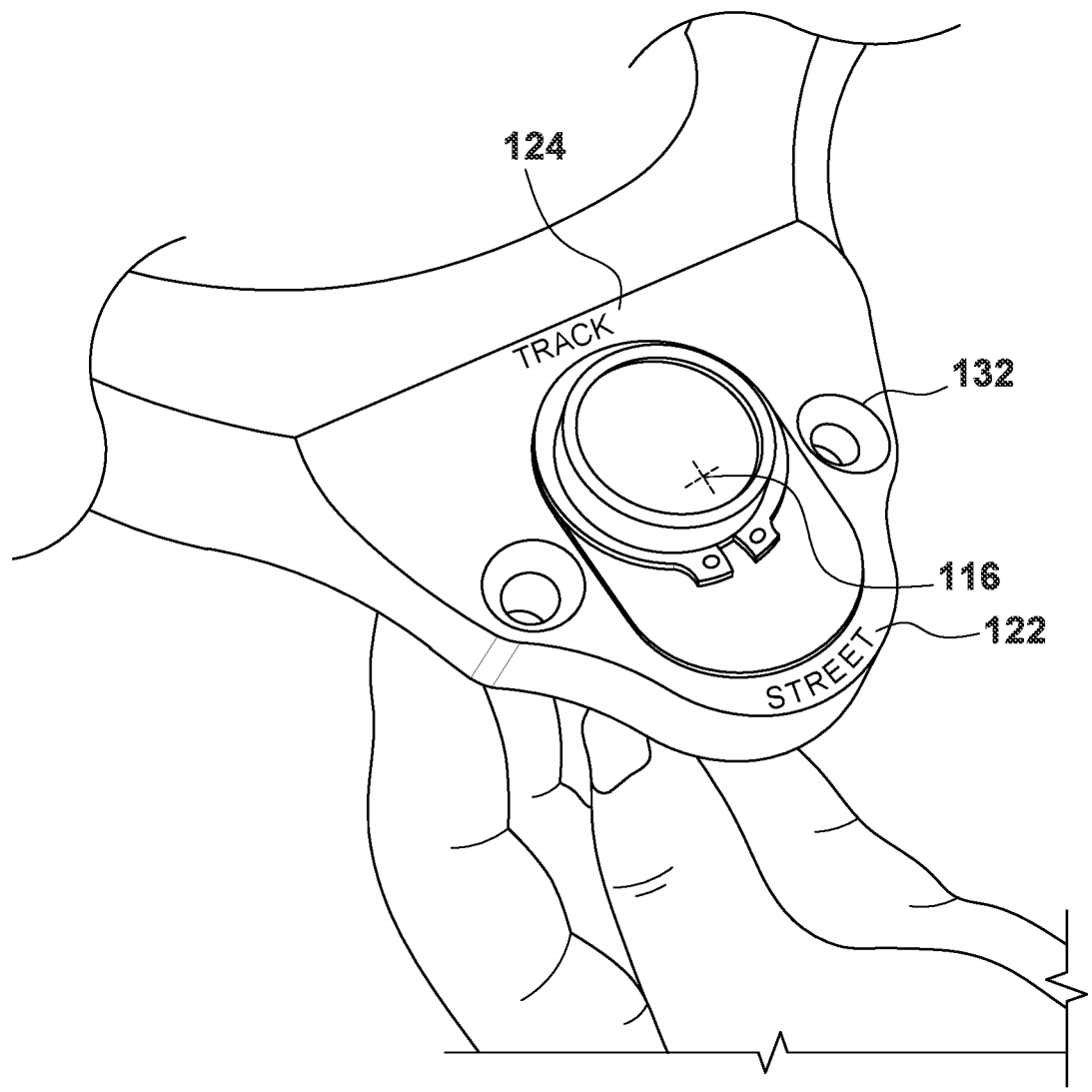
FIG. 6 is another illustrative embodiment showing the plurality of locking screws of FIG. 5 being completely removed to allow the "pill" adjustment component to be disengaged.
Figure 7:
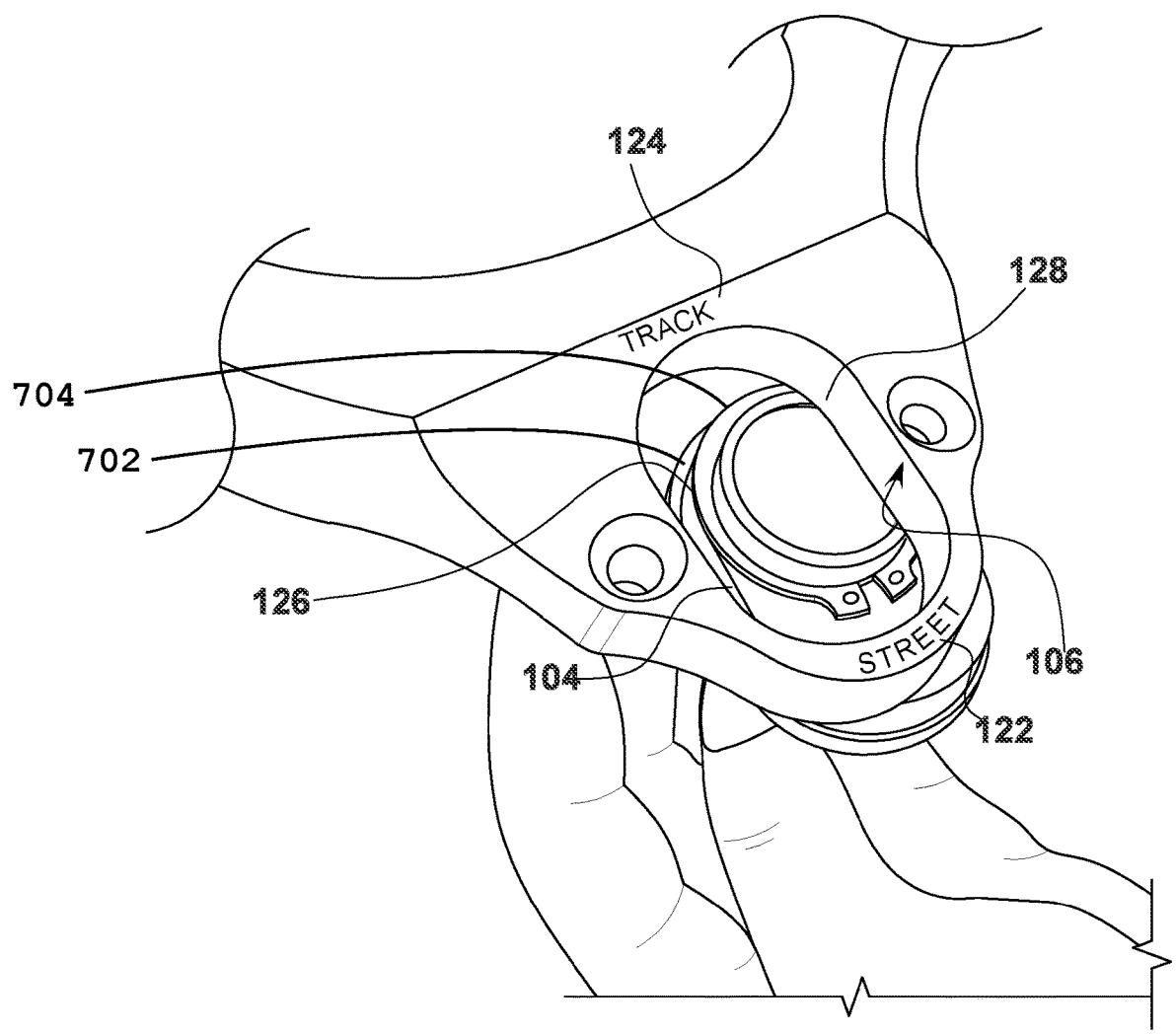
FIG. 7 is another illustrative embodiment showing the "pill" adjustment component being removed and disengaged from the camber adjustment system.

As seen in FIGS. 5, 6, and 7, in one preferred embodiment, in order to change the settings 110, the technician and/or user would simply loosen the lock screws 114 and completely remove the pill adjustment component structure 102 which exposes the inner surface 106 on the upper control arm that is in direct contact with the pill-like structure 102 with the pill alignment surface for ensuring the pill-like adjustment component 102 is positionally locked relative to the control arm.

As seen clearly in FIG. 7, the pill adjustment component 102 has a pill alignment surface 104 for aligning with a control arm alignment surface 106 of a control arm 100 to provide multiple alignment settings 110. In particular, the pill adjustment component 102 includes an inward pull adjustment component for camber adjustment and caster adjustment on an alignment track and contains an outer pill adjustment component for large adjustment at a track. FIG. 7 also shows the outward facing edge of the pill adjustment component 126 and the inward facing edge of the control arm 128, which both are used to properly align the pill adjustment component 102 to the control arm 100 with the control arm alignment surface 106, which is positionally locked relative to the control arm. The pill alignment surface 104 on the pill adjustment component 102 also helps align the pill adjustment component in relation to the control arm. The pill adjustment component 102 is depicted as comprised of a flange 702 and a vertical extension 704 extending therefrom. The vertical extension 704 is depicted and configured to extend vertically through the control arm 128, the vertical extension 704 being exposed from a top of the control arm 128, the flange 702 contacting a bottom of the control arm 128, and the lock screws 114 extending through the control arm 128 and through the flange 702. The vertical extension 704 is shown with the pill alignment surface 104 as one of its sides and the pill alignment surface 104 is shown as configured to extend from the flange 702 through the control arm 128 in contact with the control arm alignment surface 106, and the pill alignment surface 104 configured to be exposed from the top of the control arm 128.

Figure 8:
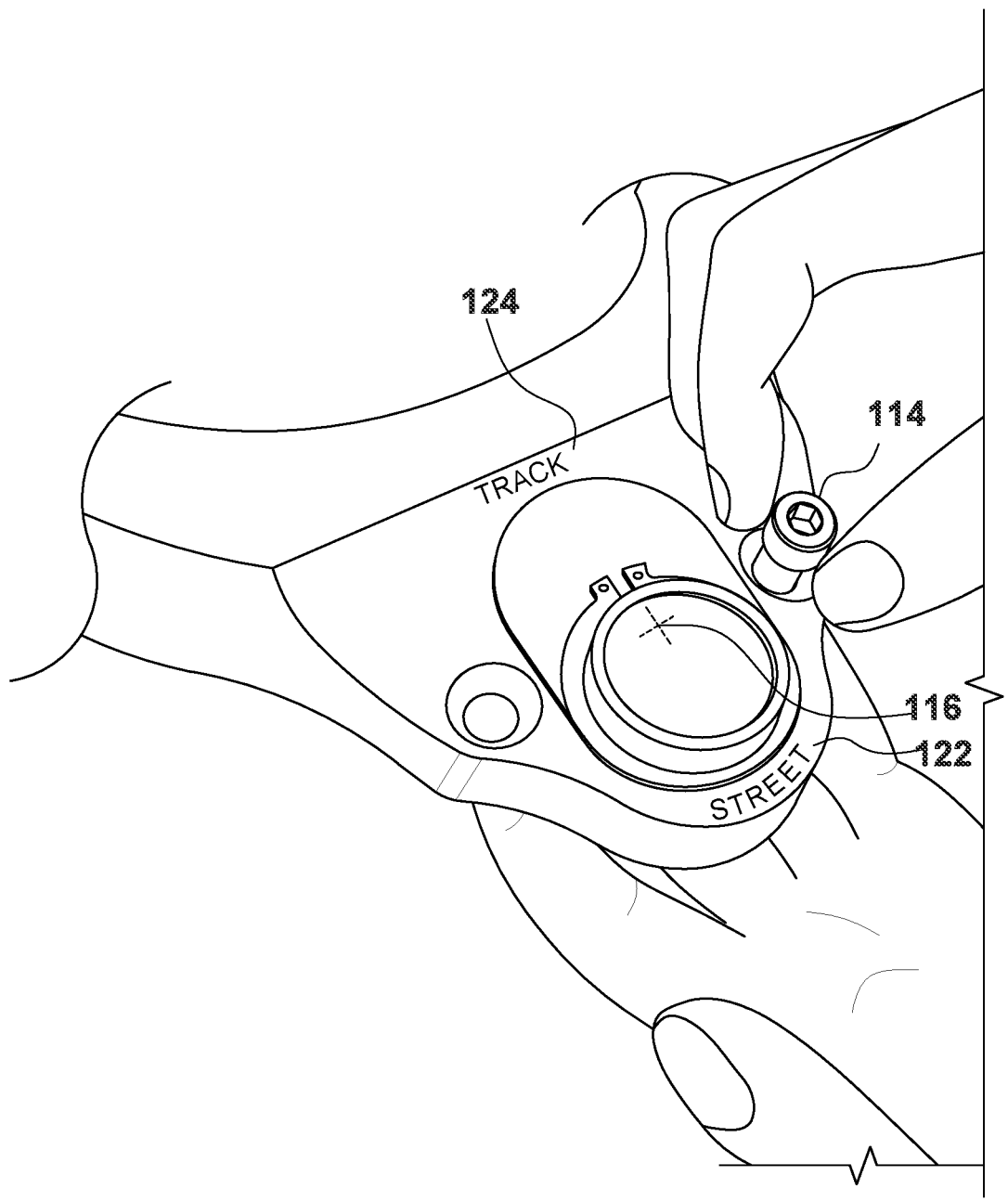
FIG. 8 is another illustrative embodiment showing the "pill" adjustment component being adjusted and positioned in the alternative "street" setting.

FIG. 8 depicts the camber adjustment system for a control arm of the subject matter of the present disclosure where the pill adjustment component 102 is shown being repositioned and/or installed in its street 122 setting configuration. Again, the pill adjustment component 102 provides a visual cue to the technician installer and/or user of what settings 110 of the camber adjustment system for a control arm of the subject matter of the present disclosure is in, by visually recognizing which settings 110, that the center 116 of the pill adjustment component 102 is positioned closet to or "pointing" at.

Figure 9:
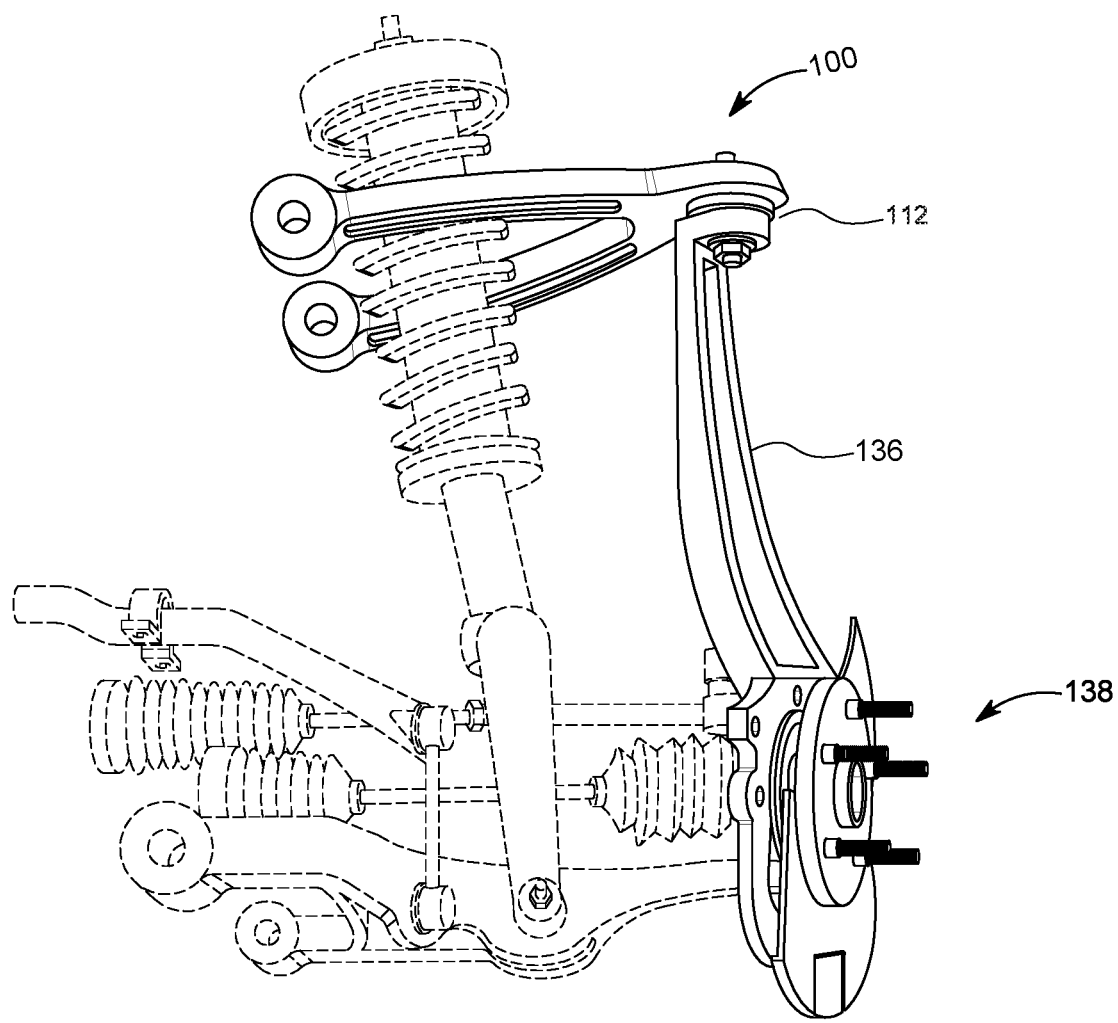
FIG. 9 is another illustrative embodiment showing the camber adjustment system subject matter for a control arm of the present disclosure being coupled to an upright component of a vehicle.

FIG. 9 shows a side view of camber adjustment system for a control arm of the subject matter of the present disclosure 100 where the ball joint attachment 112 is coupled to an upright 136 component. In a typical vehicle, an upright 136 is a component which holds the front axle drive shaft within the suspension of the vehicle and is connected to the main area which contains wheel/brake discs of a vehicle 138. In one preferred embodiment, the pill adjustment component 102 allows for a quick-change of the settings 110 allowing the ball joint attachment 112 point to be quickly changed relative to where the upright component 136 slots over or is connected to the ball joint attachment 112.

Figure 10:
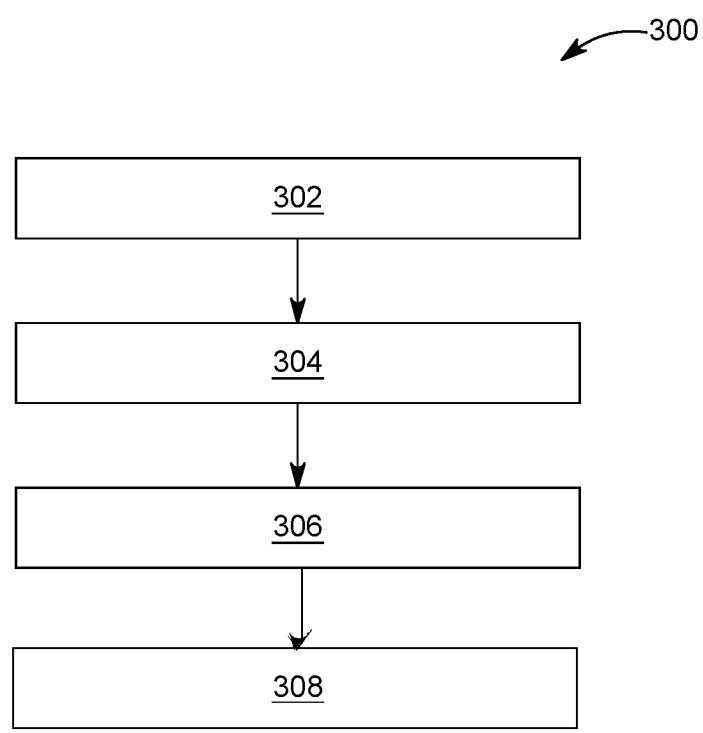
FIG. 10 depicts a method for installing the camber adjustment system subject matter for a control arm of the present disclosure.

FIG. 10 shows a flowchart depicting a method of manufacturing a camber adjustment system for an upper control arm of the subject matter of the present disclosure 300, comprising of providing pill adjustment component having a pill alignment surface for aligning with a control arm alignment surface of a control arm to provide multiple alignment settings 302; affixing a ball joint to the pill adjustment component, wherein the ball joint is off-center of the pill adjustment component 304 coupling a locking screw to the pill adjustment component 306; and coupling the ball joint attachment to a corresponding upright component 308.

Thus, it has been discovered that the camber adjustment system for a control arm of the subject matter of the present disclosure furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the camber adjustment system for a control arm of the subject matter of the present disclosure has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A camber adjustment system comprising:
a pill adjustment component, the pill adjustment component having a pill alignment surface for aligning with a control arm alignment surface of a control arm to provide multiple alignment settings, the pill adjustment component comprised of a flange and a vertical extension extending therefrom, the vertical extension configured to extend through the control arm and to be exposed from a top of the control arm, the vertical extension having the pill alignment surface as one side and the pill alignment surface configured to extend from the flange through the control arm in contact with the control arm alignment surface, the pill alignment surface configured to be exposed from the top of the control arm, and the flange configured to contact a bottom of the control arm;
a ball joint affixed to the pill adjustment component, wherein the ball joint is off-center of the pill adjustment component; and
a locking screw for coupling the pill adjustment component to the control arm, and the locking screw configured to extend through the control arm and through the flange.

2. The system of claim 1 wherein the pill adjustment component includes an inward pill adjustment component for camber adjustment and caster adjustment on an alignment rack.

3. The system of claim 1 wherein the pill adjustment component includes an outer pill adjustment component for large adjustment at a track.

4. The system of claim 1 wherein the locking screw is removable to adjust the pill alignment surface of the pill adjustment component in relation to the control arm alignment surface to switch between the multiple alignment settings.

5. The system of claim 1 wherein the locking screw fixes the pill alignment surface in relation to the control arm alignment surface to select one of the multiple alignment settings.

6. A camber adjustment system comprising:
   an upper control arm having a control arm alignment surface;
   a pill adjustment component, the pill adjustment component having a pill alignment surface and a center, the pill alignment surface for aligning the with the control arm alignment surface to provide multiple alignment settings, the pill adjustment component comprised of a flange and a vertical extension extending therefrom, the vertical extension configured to extend vertically through the control arm and to be exposed from a top of the control arm, the vertical extension having the pill alignment surface as one side and the pill alignment surface configured to extend from the flange through the control arm in contact with the control arm alignment surface, the pill alignment surface configured to be exposed from the top of the control arm, and the flange configured to contact a bottom of the control arm;
   a ball joint affixed to the pill adjustment component, wherein the ball joint is off-center of the pill adjustment component; and
   a locking screw for coupling the pill adjustment component to the upper control arm and fixing the pill alignment surface in relation to the upper control arm alignment surface, and the locking screw configured to extend through the control arm and through the flange.

7. The system of claim 6 wherein the pill adjustment component is a rectangle with a rounded corner.

8. The system of claim 6 wherein the multiple alignment settings includes a street setting and a track setting, the ball joint positioned inward of the center of the pill adjustment component for the track setting, and the ball joint positioned outward of the center of the pill adjustment component for the street setting.

9. The system of claim 6 wherein the locking screw is removable for removal of the pill adjustment component from the upper control arm.

10. The system of claim 6 wherein the pill alignment surface is an outward facing edge of the pill adjustment component and the upper control arm alignment surface is an inward facing edge of the upper control arm.

11. A method for manufacturing a camber adjustment system comprising:
    providing a pill adjustment component, the pill adjustment component having a pill alignment surface for aligning with a control arm alignment surface of a control arm to provide multiple alignment settings, the pill adjustment component comprised of a flange and a vertical extension extending therefrom, the vertical extension configured to extend vertically through the control arm and to be exposed from a top of the control arm, the vertical extension having the pill alignment surface as one side and the pill alignment surface configured to extend from the flange through the control arm in contact with the control arm alignment surface, the pill alignment surface configured to be exposed from the top of the control arm, and the flange configured to contact a bottom of the control arm;
    affixing a ball joint to the pill adjustment component, wherein the ball joint is off-center of the pill adjustment component; and
    coupling a locking screw to the pill adjustment component, the locking screw extending through the control arm and through the flange.

12. The method of claim 11 wherein providing the pill adjustment component includes providing the pill adjustment component having an inward pill adjustment component for camber adjustment and caster adjustment on an alignment rack.

13. The method of claim 11 wherein providing the pill adjustment component includes providing the pill adjustment component having an outer pill adjustment component for large adjustment at a track.

14. The method of claim 11 wherein coupling the locking screw includes coupling the locking screw configured to be removable to adjust the pill alignment surface of the pill adjustment component in relation to the control arm alignment surface to switch between the multiple alignment settings.

15. The method of claim 11 wherein coupling the locking screw includes coupling the locking screw configured to fix the pill alignment surface in relation to the control arm alignment surface to select one of the multiple alignment settings.

16. The method of claim 11 further comprising:
    coupling the pill adjustment component to an upper control arm having the control arm alignment surface; and
    wherein coupling the locking screw fixes the pill alignment surface in relation to the control arm alignment surface.

17. The method of claim 16 wherein providing the pill adjustment component includes providing the pill adjustment component having a rectangular shape with a rounded corner.

18. The method of claim 16 wherein coupling the locking screw provides the multiple alignment settings which includes a street setting and a track setting, the ball joint positioned inward of the center of the pill adjustment component for the track setting, and the ball joint positioned outward of the center of the pill adjustment component for the street setting.

19. The method of claim 16 wherein coupling the locking screw includes coupling the locking screw being removable for removal of the pill adjustment component from the upper control arm.

20. The method of claim 16 wherein:
    providing the pill adjustment component includes providing the pill adjustment component with the pill alignment surface being an outward facing edge of the pill adjustment component; and
    coupling the pill adjustment component to the upper control arm includes coupling the pill adjustment component to the upper control arm with the control arm alignment surface being an inward facing edge of the upper control arm.

* * * * *